(12) United States Patent
Fleming et al.

(10) Patent No.: US 8,311,013 B2
(45) Date of Patent: Nov. 13, 2012

(54) METHOD FOR EFFICIENTLY INCREASING HAND-OFF AND ACCESS RELIABILITY

(75) Inventors: Philip J. Fleming, Glen Ellyn, IL (US); Rangsan Leelahakriengkrai, Streamwood, IL (US); Robert S. Nikides, Carol Stream, IL (US); Ivan N. Vukovic, Arlington Heights, IL (US)

(73) Assignee: Motorola Mobility LLC, Libertyville, IL (US)

( * ) Notice: Subject to any disclaimer, the term of this patent is extended or adjusted under 35 U.S.C. 154(b) by 512 days.

(21) Appl. No.: 12/607,219

(22) Filed: Oct. 28, 2009

(65) Prior Publication Data

US 2011/0098047 A1    Apr. 28, 2011

(51) Int. Cl.
*H04B 7/216* (2006.01)
*H04Q 7/20* (2006.01)
(52) U.S. Cl. ........ 370/331; 370/328; 370/329; 370/335; 370/342; 709/231; 455/437
(58) Field of Classification Search .......... 370/208–342; 709/223–231; 455/437–445; 714/776
See application file for complete search history.

(56) References Cited

U.S. PATENT DOCUMENTS

| 5,818,826 | A  | * | 10/1998 | Gfeller et al. ................. 370/342 |
| 8,005,039 | B2 | * | 8/2011 | Kamuf et al. ................. 370/328 |
| 2003/0093747 | A1 | * | 5/2003 | Brouet et al. ................. 714/776 |
| 2005/0099939 | A1 | * | 5/2005 | Huh et al. ..................... 370/210 |
| 2006/0153112 | A1 |  | 7/2006 | Lim et al. |
| 2007/0112972 | A1 | * | 5/2007 | Yonge et al. .................. 709/231 |
| 2011/0286355 | A1 | * | 11/2011 | Snapir et al. .................. 370/253 |

FOREIGN PATENT DOCUMENTS

| EP | 1835649 A1 | 9/2007 |
| GB | 2314487 A | 12/1997 |
| WO | 2006075820 A1 | 7/2006 |
| WO | 2006105005 A2 | 10/2006 |

OTHER PUBLICATIONS

Patent Cooperation Treaty, International Search Report and Written Opinion of the International Searching Authority for International Application No. PCT/US2010/053103, Apr. 21, 2011, 16 pages.

* cited by examiner

*Primary Examiner* — Afsar M. Qureshi

(57) ABSTRACT

A method, a network base station, and a user communication device for transmitting control data are disclosed. A processor 210 may encode a rescue frame 502 of a set of frames with a higher rescue overhead to data ratio. The processor 210 may encode an ancillary frame 504 of the set of frames with a lower rescue overhead to data ratio. A transceiver 240 may transmit the set of frames.

20 Claims, 12 Drawing Sheets

600

*800*

*1200*

METHOD FOR EFFICIENTLY INCREASING HAND-OFF AND ACCESS RELIABILITY

1. Field of the Invention

The present invention relates to a method and system for reliably transmitting data. The present invention further relates to using an adjustable modulation and coding scheme to create reliable transmission connections.

2. Introduction

Performance of connection initiation, reliability of connection initiation, continuity, and data throughput in a telecommunication system may depend on the reliable transmission of the broadcast control channel information. The telecommunication system may be a wireless communication technology, such as a WiMAX system. The broadcast control channel information may be transmitted using a frame control channel or a media access protocol (MAP). The MAP may consume radio resources that may otherwise be used to transmit flow data. The MAP may provide mobility services, operation, maintenance, call handling, and other services. The MAP may use repetition coding with varying levels of repetition per frame to increase the reliability of a transmission.

The deployment of aggressive frequency re-use patterns, such as a partial usage of sub-channels (PUSC), may use a modulation and coding scheme (MCS) that consumes a large fraction of the radio resource in order to provide sufficiently reliable transmission of the MAP. The PUSC may be differentiated by an effective reuse rate.

BRIEF DESCRIPTION OF THE DRAWINGS

Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The present invention comprises a variety of embodiments, such as a method, an apparatus, and an electronic device, and other embodiments that relate to the basic concepts of the invention. The electronic device may be any manner of computer, mobile device, or wireless communication device.

A method, a network base station, and a user communication device for transmitting control data are disclosed. A processor may encode a set of frames with a rescue frame with more reliability and an ancillary frame with more spectrum efficiency. A transceiver may transmit the set of frames.

Figure 1:
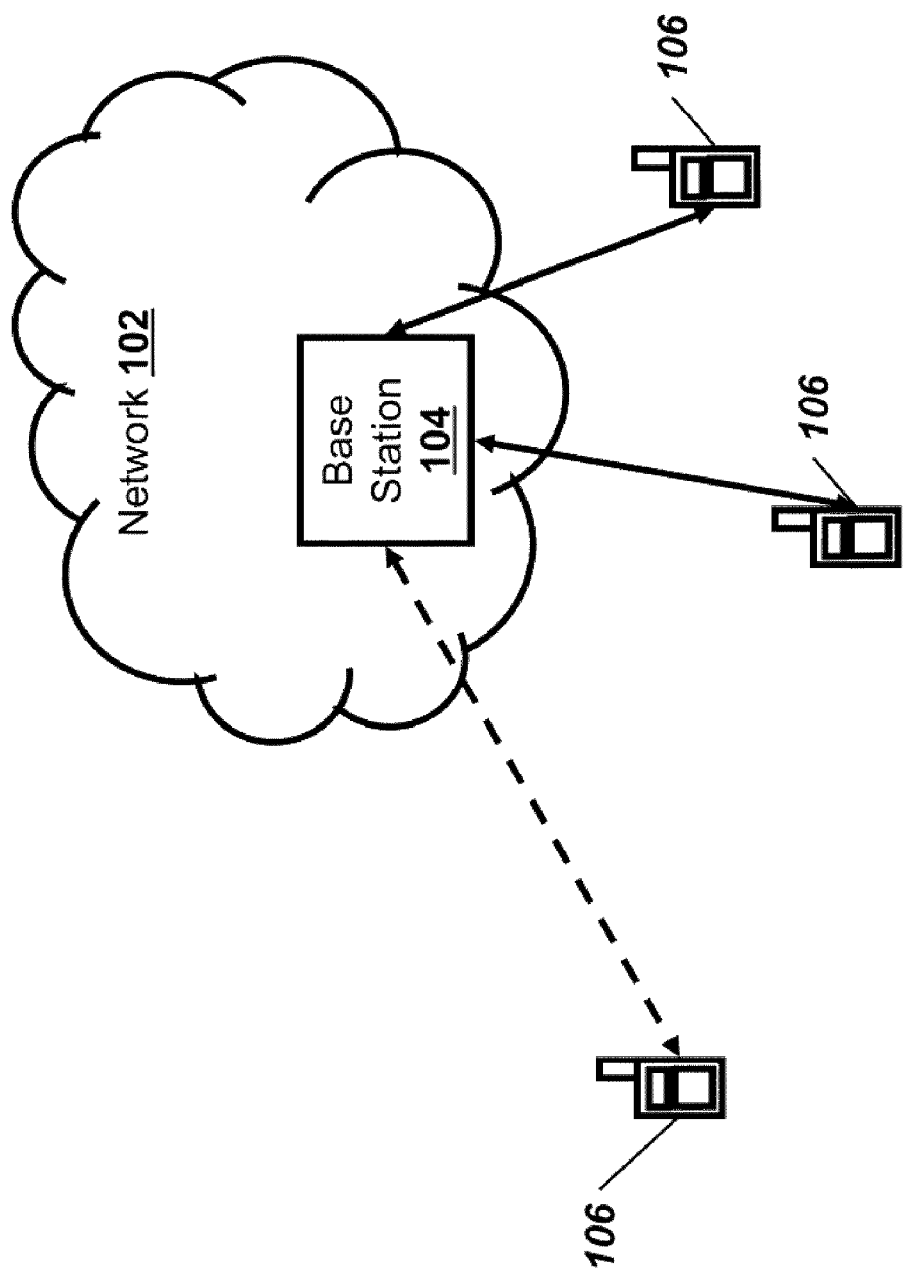
FIG. 1 illustrates one embodiment of a communication system.

FIG. 1 illustrates one embodiment of a communication system 100. The communication system 100 may include a network 102, base station 104, and a mobile device, such as a user device 106. Various communication devices may exchange data or information through the network 102. The network 102 may be a WiMAX network or other type of telecommunication network. A network entity, such as the base station 104, may connect the mobile device 106 to the network 102. For one embodiment, the base station 104 may be a distributed set of servers in the network. The mobile device 106 may be one of several types of handheld or mobile devices, such as, a mobile phone, a laptop, or a personal digital assistant (PDA). For one embodiment, the mobile device 106 may be a WiFi® capable device, a WiMax® capable device, or other wireless devices.

Simulations show that a quadrature phase shift key (QPSK) with a rate of 1/2 and a repetition level of 6 may be necessary but not always sufficient to provide adequate hand off and access reliability. When frequency re-use one is deployed, a partial usage of sub-channels (PUSC) with an effective reuse rate of 1/3 and a media access protocol (MAP) with a repetition rate of six may be sufficient to provide 98 percent handoff reliability. However, these control settings may consume a great deal of overhead. By interspersing a rescue frame that has greater reliability with an ancillary frame that has more efficient spectrum use when transmitting a set of frames, a base station 104-may reduce overhead while still having a workable level of reliability.

Figure 2:
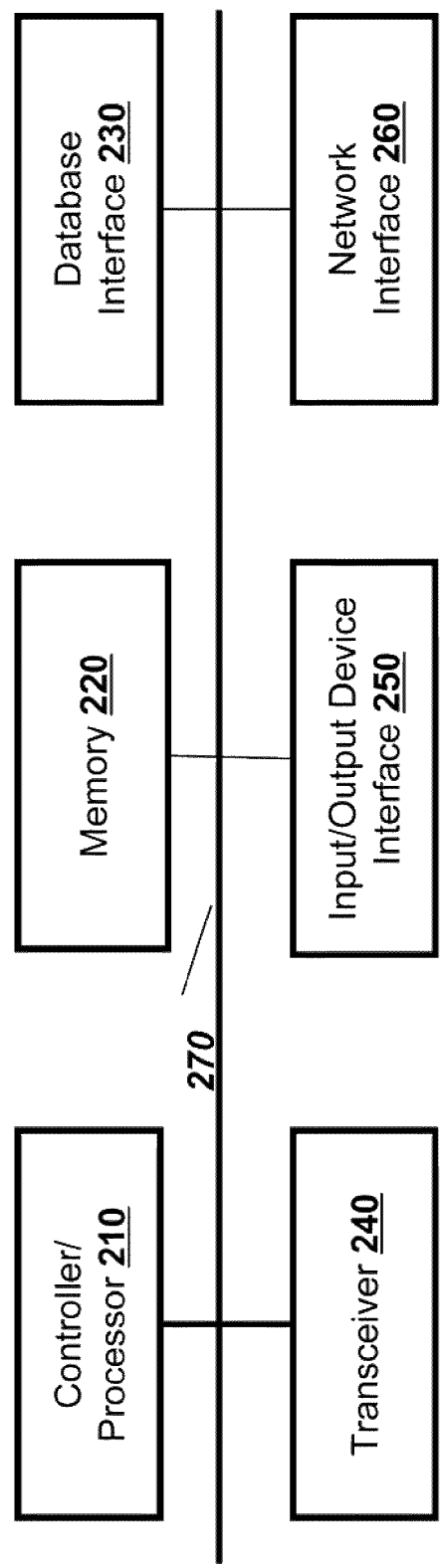
FIG. 2 illustrates a possible configuration of a computing system to act as a base station.

FIG. 2 illustrates a possible configuration of a computing system to act as a base station 104. The base station 104 may include a controller/processor 210, a memory 220, a database interface 230, a transceiver 240, input/output (I/O) device interface 250, and a network interface 260, connected through bus 270. The base station 104 may implement any operating system, such as Microsoft Windows®, UNIX, or LINUX, for example. Client and server software may be written in any programming language, such as C, C++, Java or Visual Basic, for example. The server software may run on an application framework, such as, for example, a Java® server or .NET® framework The controller/processor 210 may be any programmed processor known to one of skill in the art. However, the decision support method may also be implemented on a general-purpose or a special purpose computer, a programmed microprocessor or microcontroller, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, any device or devices capable of implementing the decision support method as described herein may be used to implement the decision support system functions of this invention.

The memory 220 may include volatile and nonvolatile data storage, including one or more electrical, magnetic or optical memories such as a random access memory (RAM), cache, hard drive, or other memory device. The memory may have a cache to speed access to specific data. The memory 220 may also be connected to a compact disc-read only memory (CD-ROM), digital video disc-read only memory (DVD-ROM), DVD read write input, tape drive, or other removable memory device that allows media content to be directly uploaded into the system.

Data may be stored in the memory or in a separate database. The database interface 230 may be used by the controller/processor 210 to access the database. The database may contain any formatting data to connect the mobile device 106 to the network 102.

The transceiver 240 may create a data connection with the mobile device. The transceiver may use a transmitter array to create a downlink and uplink control channel between the base station 104 and the mobile device 106.

The I/O device interface 250 may be connected to one or more input devices that may include a keyboard, mouse, pen-operated touch screen or monitor, voice-recognition device, or any other device that accepts input. The I/O device interface 250 may also be connected to one or more output devices, such as a monitor, printer, disk drive, speakers, or any other device provided to output data. The I/O device interface 250 may receive a data task or connection criteria from a network administrator.

The network connection interface 260 may be connected to a communication device, modem, network interface card, a transceiver, or any other device capable of transmitting and receiving signals from the network 102. The network connection interface 260 may be used to connect a client device 106 to a network 102. The components of the base station 104 may be connected via an electrical bus 270, for example, or linked wirelessly.

Client software and databases may be accessed by the controller/processor 210 from memory 220, and may include, for example, database applications, word processing applications, as well as components that embody the decision support functionality of the present invention. The base station 104 may implement any operating system, such as Microsoft Windows®, LINUX, or UNIX, for example. Client and server software may be written in any programming language, such as C, C++, Java or Visual Basic, for example. Although not required, the invention is described, at least in part, in the general context of computer-executable instructions, such as program modules, being executed by the electronic device, such as a general purpose computer. Generally, program modules include routine programs, objects, components, data structures, etc. that perform particular tasks or implement particular abstract data types. Moreover, those skilled in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like.

Figure 3:
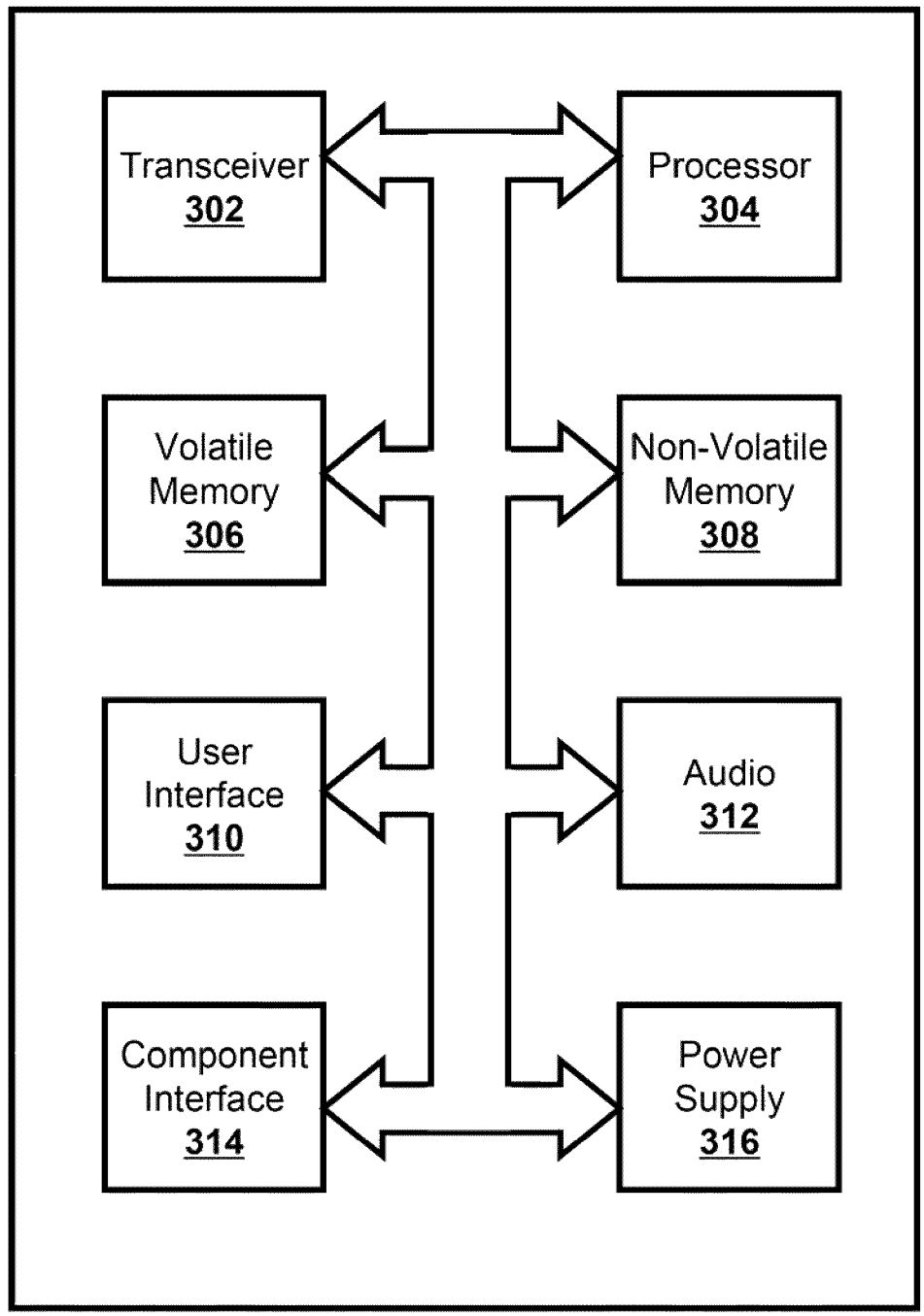
FIG. 3 illustrates in a block diagram one embodiment of the user communication device.

FIG. 3 illustrates in a block diagram one embodiment of a user communication device 106, or terminal. The user communication device 106 may be capable of accessing the information or data stored in the network 102. For some embodiments of the present invention, the user communication device 106 may also support one or more applications for performing various communications with the network 102. The user communication device 106 may be a handheld device, such as, a mobile phone, a laptop, or a personal digital assistant (PDA). For some embodiments of the present invention, the user communication device 106 may be WiFi® capable device, which may be used to access the network 102 for data or by voice using VOIP.

The user communication device 106 may include a transceiver 302, which is capable of sending and receiving data over the network 102. The user communication device 106 may include a processor 304 that executes stored programs. The user communication device 106 may also include a volatile memory 306 and a non-volatile memory 308 which are used by the processor 304. The user communication device 106 may include a user input interface 310 that may comprise elements such as a keypad, display, touch screen, and the like. The user communication device 106 may also include a user output device that may comprise a display screen and an audio interface 312 that may comprise elements such as a microphone, earphone, and speaker. The user communication device 106 also may include a component interface 314 to which additional elements may be attached, for example, a universal serial bus (USB) interface. Finally, the user communication device 106 may include a power supply 316.

Figure 4:
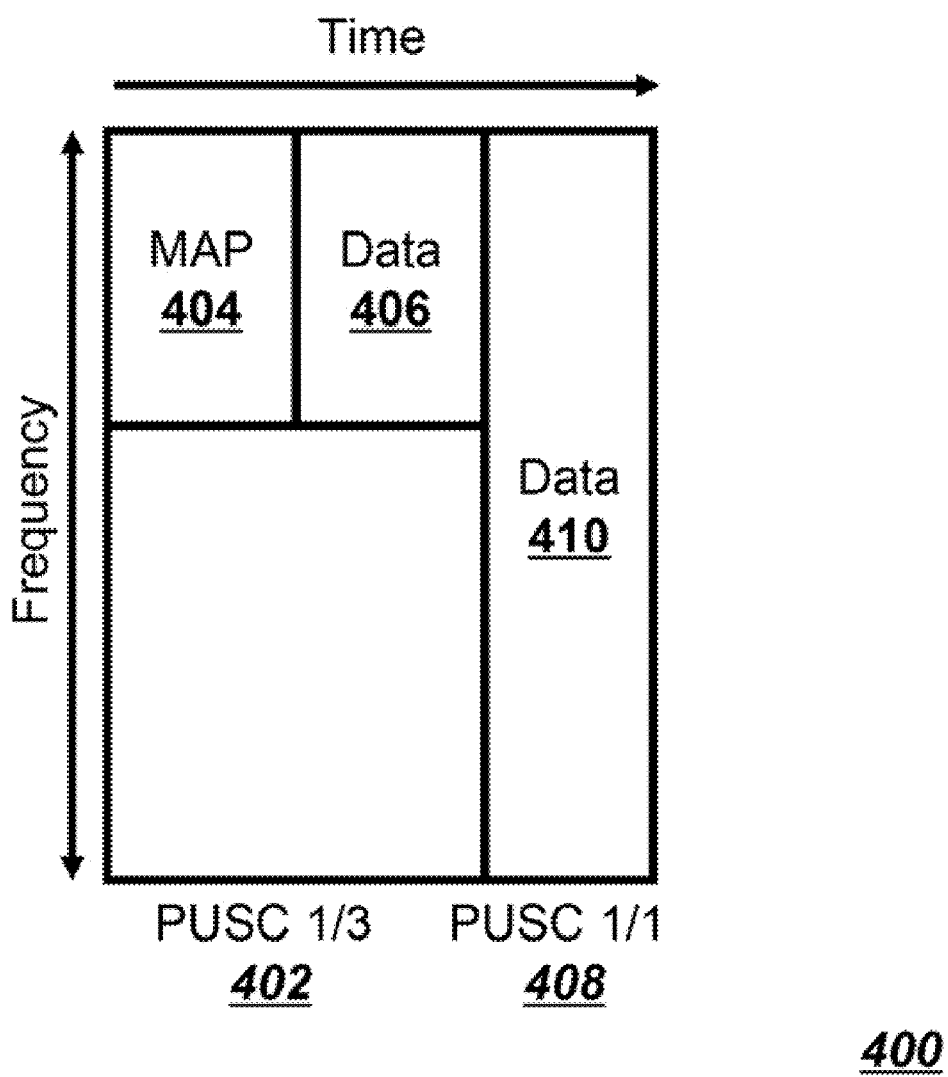
FIG. 4 illustrates, in a time-frequency grid, one embodiment of a frame.

FIG. 4 illustrates one embodiment of a frame 400 using PUSC as a control channel. In a frame section, as defined on a time-frequency grid, using a PUSC 402 with an effective reuse rate of 1/3, the frame section 402 may include a MAP resource 404 and a data section 406. The MAP resource 404 may be an application layer protocol used to provide mobility services, operation services, maintenance services, call handling, subscriber services, and other services. In a frame section using a PUSC 408 with an effective reuse rate of 1/1, the frame section 408 may include a full data section 410.

A MAP resource 404 may provide greater reliability by using a higher repetition rate, a less complex modulation scheme, or a higher coding rate. However, this approach may leave fewer resources available for the transmission of data, reducing the overall spectrum efficiency. The relationship between MAP resources 404 and data resources 406 may be described in an overhead to data ratio, with a low overhead to data ratio representing more efficiency at the cost of reliability, while a high overhead to data ratio representing more reliability at the cost of efficiency.

Figure 5:
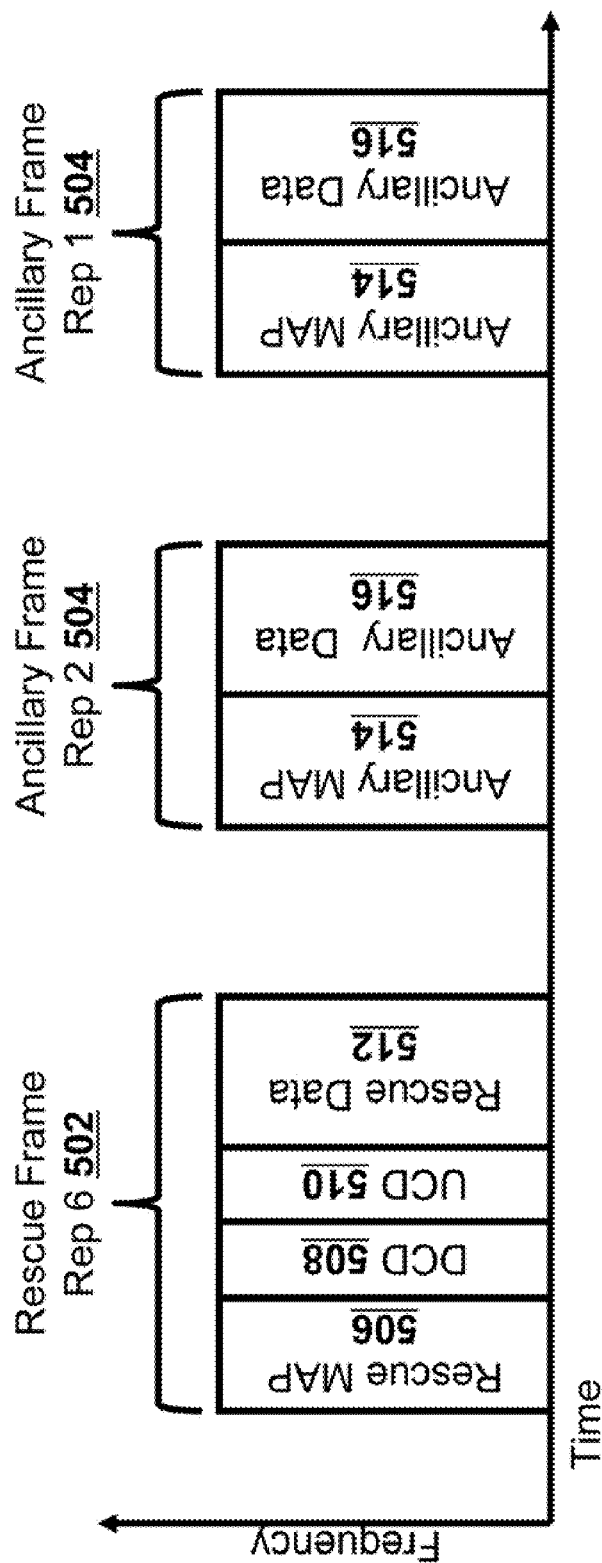
FIG. 5 illustrates, in a time-frequency grid, one embodiment of a data transmission.

FIG. 5 illustrates one embodiment of a data transmission 500. The data transmission 500 may be a set of frames. The set of frames may have at least one rescue frame 502 and at least one ancillary frame 504. The rescue frame 502 may have a rescue overhead with a rescue MAP 506 with a more reliable modulation and coding scheme; a downlink channel description (DCD) 508 and uplink channel description (UCD) 510; and rescue data 512. The ancillary frame 504 may have an ancillary overhead with an ancillary MAP 514 with a less reliable, more complex modulation and coding scheme; and ancillary data 516. The rescue frame 502 may have a higher overhead to data ratio compared to a lower overhead to data ratio of the ancillary frame 504. For purposes of clarity, the rescue frame 502 may be referred to as having a higher rescue overhead to data ratio and the ancillary frame 504 may be referred to as having a lower ancillary overhead to data ratio. The overhead to data ratio may be increased by using a higher coding rate, a higher repetition rate, a less complex modulation scheme, or other methods to improve reliability. The overhead to data ratio may be decreased by using a lower coding rate, a lower repetition rate, or a more complex modulation scheme to improve spectrum efficiency.

The rescue frame 502 and the ancillary frame 504 may be transmitted in a fixed frame schedule, such as the rescue frame 502-ancillary frame 504-ancillary frame 504 schedule shown. The repetition rate of ancillary frames 504 may be adjusted on an as needed basis. The rescue frame 502 may have a MAP with a repetition rate of 6, 4, or 2, as long as the repetition rate is high compared to the repetition rate of the ancillary frame 504 and sufficient to provide handoff and access reliability. The ancillary frame 504 may have a MAP with a repetition rate of 1, 2, or 4, as long as the repetition rate is lower than the repetition rate of the rescue frame 502 and is high enough to support the transmission of all flows scheduled in the frame 502.

Figure 6:
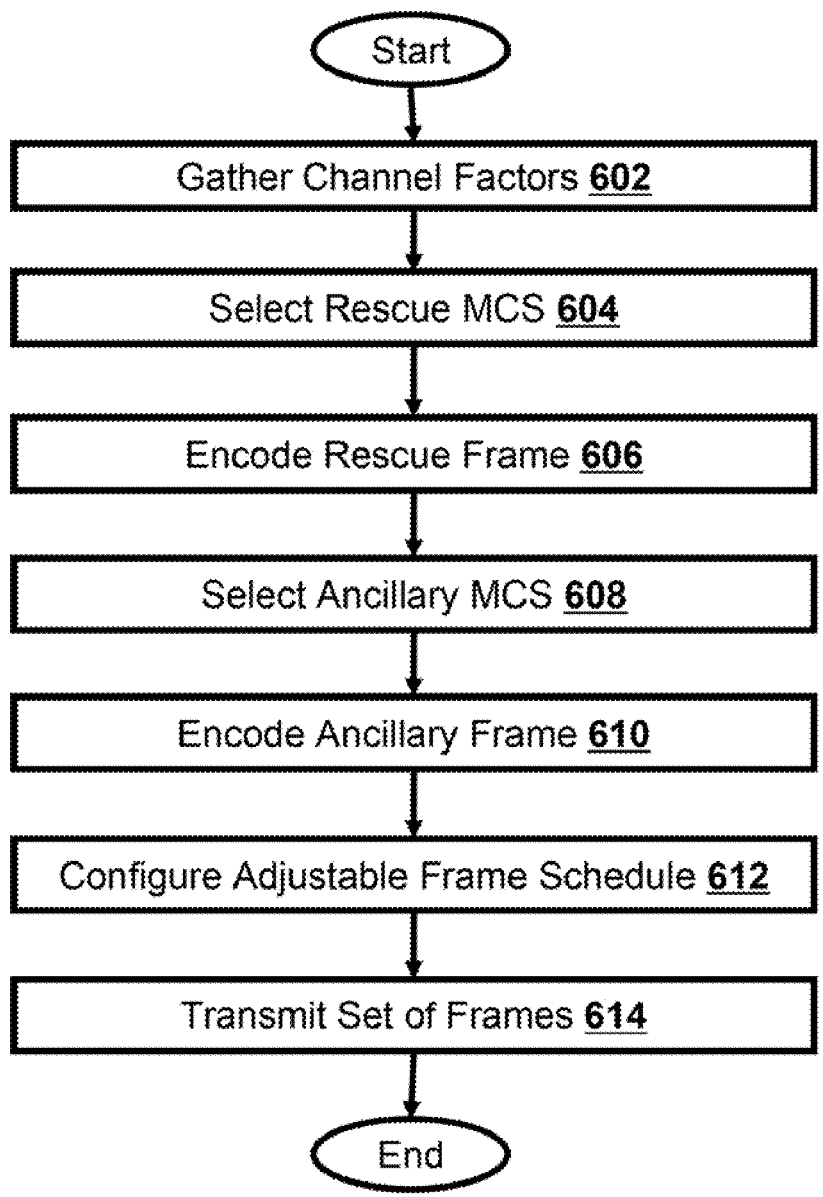
FIG. 6 illustrates, in a flowchart, one embodiment of a method for transmitting data with a hybrid rescue frame schedule.

FIG. 6 illustrates one embodiment of a method 600 for transmitting data with a hybrid rescue frame schedule. The base station 104 may gather a set of channel factors to facilitate constructing a proper frame schedule (Block 602). The base station may continue to gather channel factors during encoding and transmission, and make adjustments as necessary. After collecting the appropriate initial factors, the base station 104 may select an appropriate rescue modulation and coding scheme (MCS) for the rescue frame 502, based on the collected factors (Block 604). The base station 104 may encode the rescue overhead of the rescue frame 502 with a higher overhead to data ratio modulation and coding scheme (Block 606). The base station 104 may select an appropriate ancillary MCS for the ancillary frame 504, based on the collected factors (Block 608). The base station 104 may encode the ancillary frame 504 with a lower overhead to data ratio MCS (Block 610). The base station 104 may then transmit a set of frames including the rescue frame 502 and the ancillary frame 504 (Block 608). The base station 104 may transmit frames on a fixed frame schedule or on an adjustable frame schedule. On a fixed frame schedule, a set number of ancillary frames 504, of possibly different levels of spectrum efficiency, may follow or precede each rescue frame 502 or set of rescue frames 502. On an ancillary frame schedule, the base station 104 may vary the number and placement of ancillary frames 504, the spectrum efficiency of the ancillary frames 504, the number and placement of rescue frames 502, and the reliability of the rescue frames 502. The base station 104 may configure the adjustable frame schedule, based on the collected factors (Block 612). The base station 104 may then transmit a set of frames including the rescue frame 502 and the ancillary frame 504 (Block 614).

Figure 7:
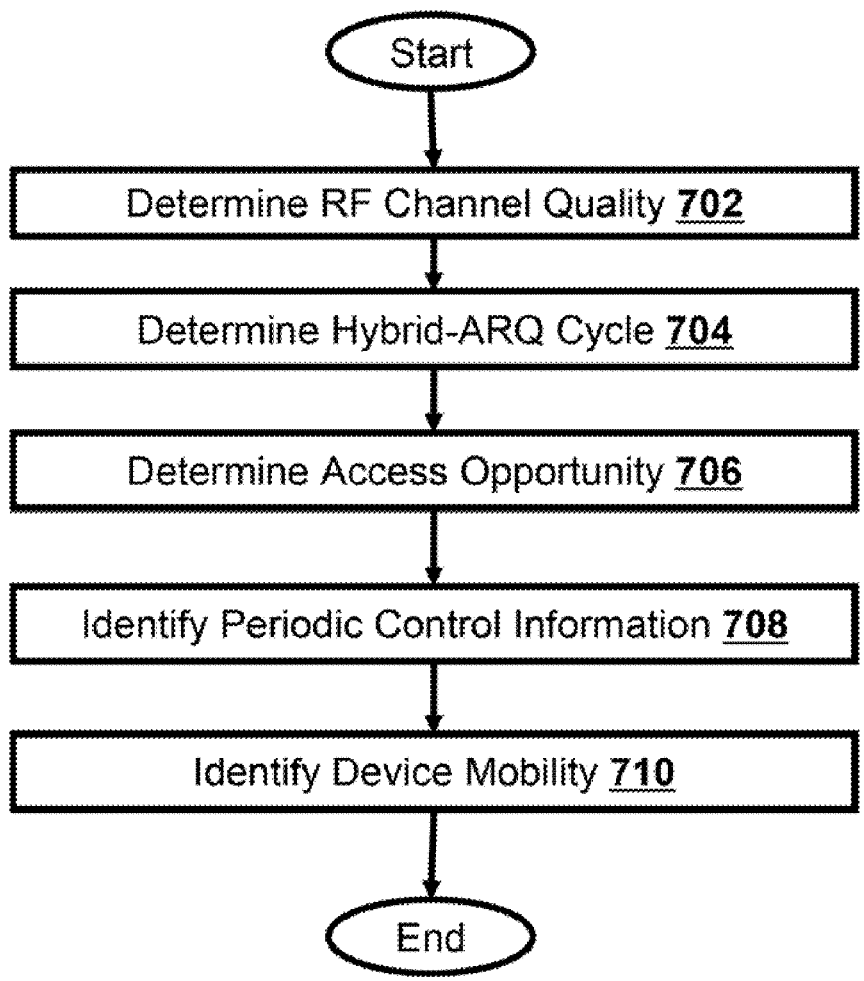
FIG. 7 illustrates, in a flowchart, one embodiment of a method for gathering channel factors.

FIG. 7 illustrates one embodiment of a method 700 for gathering channel factors. The base station may collect a series of channel factors effecting the data transmission. For example, the base station 104 may determine the radio frequency (RF) channel quality for the mobile device 106 with the weakest connection with that base station 104 (Block 702). The base station 104 may determine a hybrid-automatic repeat request (ARQ) cycle for each frame (Block 704). The base station 104 may determine access opportunity for user communication devices 106 wanting to gain access to the base station 104 (Block 706). The base station 104 may identify periodic control information, such as DCD, UCD, and control information interval (Block 708). The base station 104 may identify the mobility of user communication devices 106 wanting to gain access to the base station 104 (Block 710).

Figure 8:
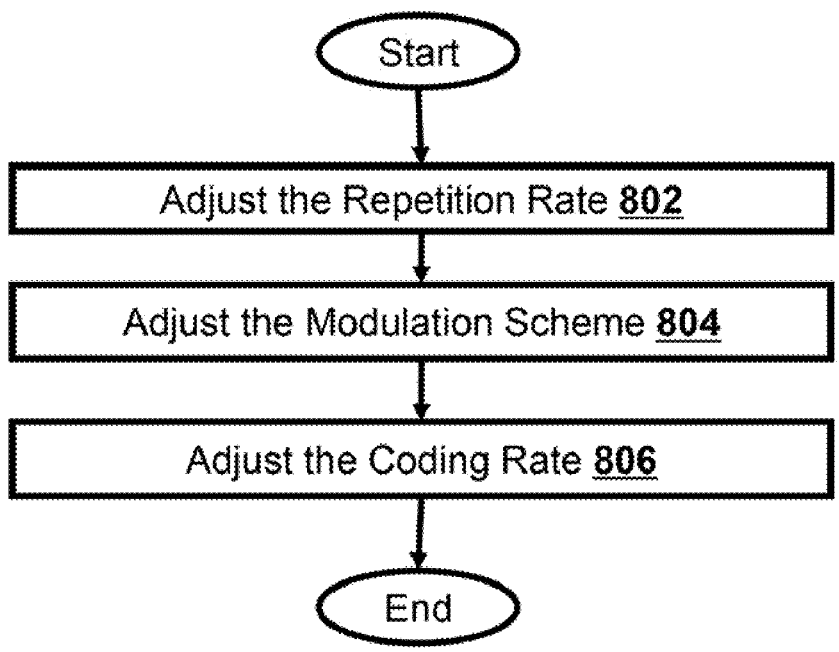
FIG. 8 illustrates, in a flowchart, one embodiment of a method for adjusting a modulation and coding scheme.

FIG. 8 illustrates one embodiment of a method 800 for adjusting a MCS. The base station 104 may adjust the rescue overhead to produce a high reliability, with a higher repetition rate, a less complex modulation scheme, and a higher coding rate. Further, the base station 104, may adjust the ancillary overhead to produce a high spectrum efficiency, with a lower repetition rate, a more complex modulation scheme, and a lower coding rate. The base station 104 may adjust the MAP repetition rate, choosing a higher repetition rate of 6 for a rescue frame 502 and a lower repetition rate of 4, 2, or 1 for the ancillary frame 504 (Block 802). The base station 104 may adjust the modulation scheme, choosing a less complex modulation scheme, such as QPSK, for the rescue frame 502 and a more complex modulation scheme, such as 8PSK or 16-QAM, for the ancillary frame 504 (Block 804). The base station 104 may adjust the coding rate, choosing a higher coding rate, such as 1/2 for the rescue frame 502 and choosing a lower coding rate, such as 3/4 for the ancillary frame 504.

Figure 9:
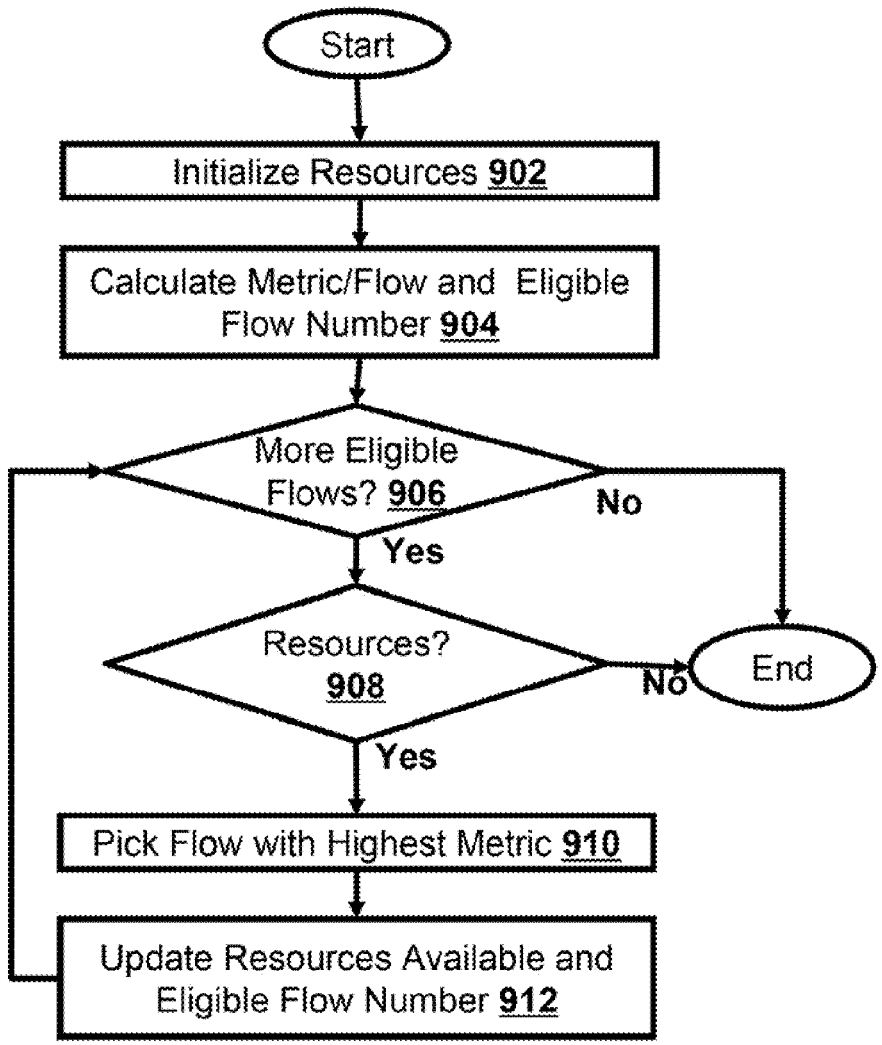
FIG. 9 illustrates, in a flowchart, one embodiment of a method for homogenous media access protocol transmission.

FIG. 9 illustrates one embodiment of a method 900 for homogenous MAP transmission, or transmissions where the MAP repetition of ancillary frames 504 are not changed. The base station 104 may initialize the resources available (Block 902). The base station 104 may calculate the metric per flow and the number of eligible flows (Block 904). The base station 104 may assume a MAP with a repetition four. If no more eligible flows are available (Block 906) or no more resources are available (Block 908), the process may be complete. If more eligible flows are available (Block 906) and more resources are available (Block 908), the base station 104 may pick the flow with the highest metric (Block 910). The base station 104 may then update the resources available and the number of eligible flows (Block 912).

Figure 10:
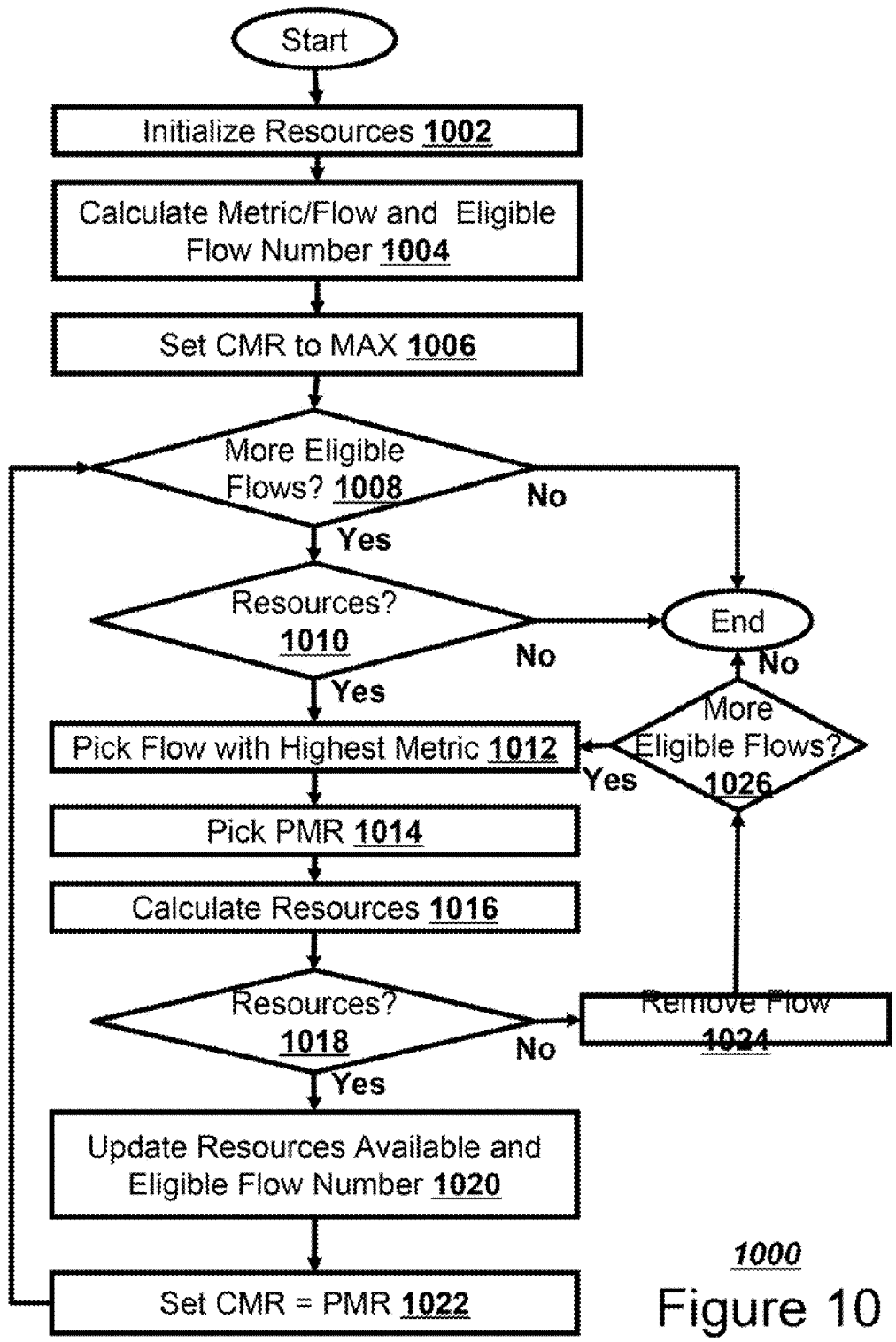
FIG. 10 illustrates, in a flowchart, one embodiment of a method for adjusting the overhead to data ratio of a media access protocol transmission of ancillary frames.

FIG. 10 illustrates one embodiment of a method 1000 for adjusting the overhead to data ratio of a MAP transmission of ancillary frames 504. The base station 104 may initialize the resources available (Block 1002). The base station 104 may calculate the metric per flow and the number of eligible flows (Block 1004). The base station 104 may set the current MAP reliability (CMR) to the maximum (MAX), such as a repetition level of six, a QPSK modulation scheme, or a coding rate of 1/2 (Block 1006). If no more eligible flows are available (Block 1008) or no more resources are available (Block 1010), the process may be complete. If more eligible flows are available (Block 1008) and more resources are available (Block 1010), the base station 104 may pick the flow with the highest metric (Block 1012). The base station 104 may select a projected MAP reliability (PMR) based on the minimum MCS scheduled so far (Block 1014). The base station 104 may calculate the resources available given the PMR (Block 1016). If further resources are available (Block 1018), the base station 104 may then update the resources available and the number of eligible flows (Block 1020). The base station 104 may set the CMR to equal the PMR (Block 1022), before checking for the next eligible flow (Block 1008). If no further resources are available (Block 1018), the base station 104 may remove the current flow from the schedule in this frame (Block 1024). If more eligible flows are available (Block 1026), the base station 104 may pick the next flow with the highest metric (Block 1012). If no more eligible flows are available (Block 1026), the process may be complete.

Figure 11:
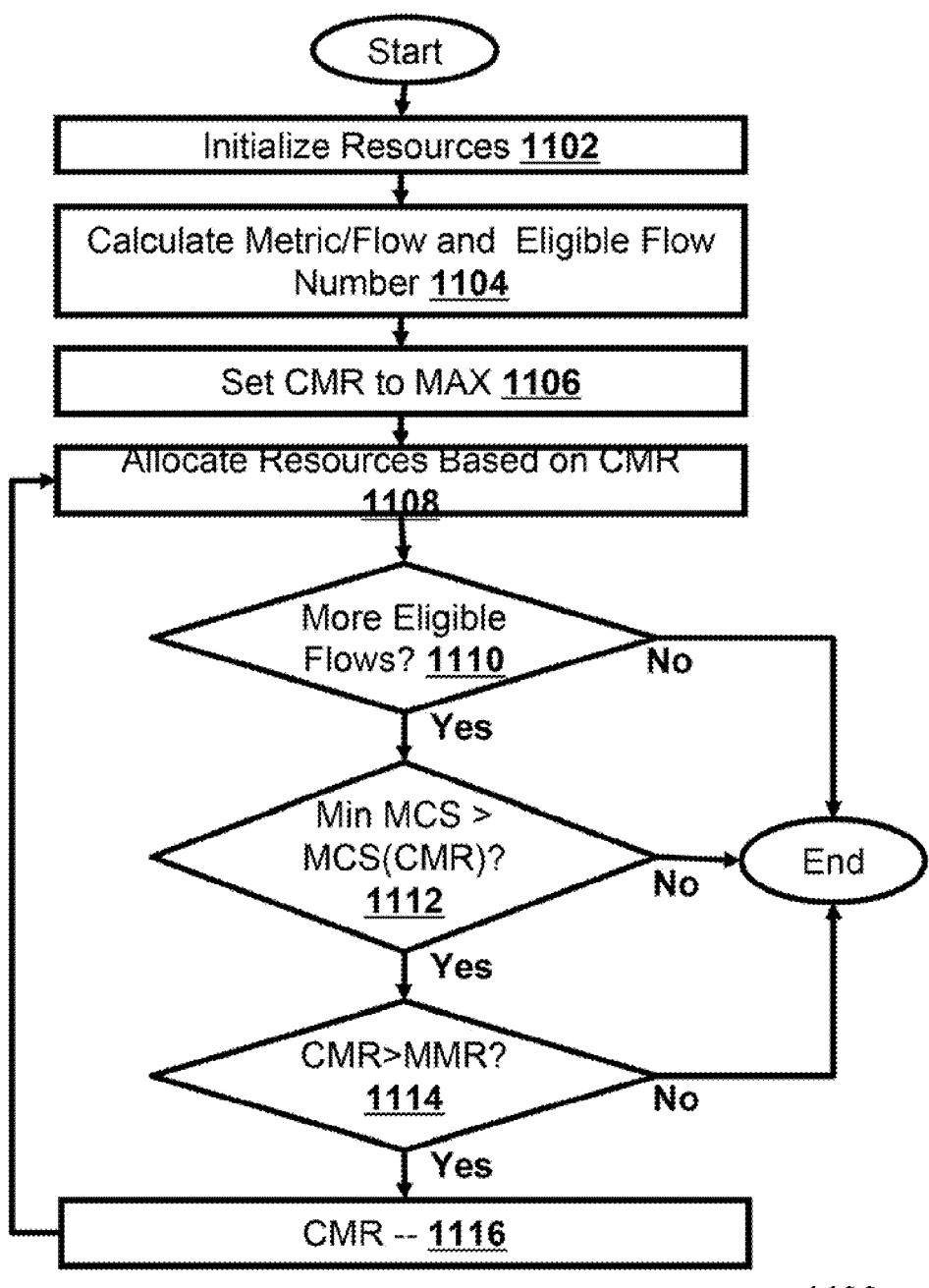
FIG. 11 illustrates, in a flowchart, an alternate embodiment of a method for adjusting the overhead to data ratio of a media access protocol transmission of ancillary frames.

FIG. 11 illustrates an alternate embodiment of a method 1100 for adjusting the overhead to data ratio of a MAP transmission of ancillary frames. The base station 104 may initialize the resources available (Block 1102). The base station 104 may calculate the metric per flow and the number of eligible flows (Block 1104). The base station 104 may set the CMR to the MAX, such as a repetition level of six, a QPSK modulation scheme, or a coding rate of 1/2 (Block 1106). The base station may allocate resources in this frame based on a fixed overhead to data ratio equaling the CMR (Block 1108). If no more eligible flows are available (Block 1110), if the minimum scheduled flow of the modulation and coding scheme is greater than the modulation and coding scheme based on the CMR (Block 1112), or if the CMR is greater than the minimum MAP reliability (MMR) (Block 1114), the process may be complete. Else, the base station 104 may decrement the CMR (Block 1116) before the base station may allocate resources in this frame based on a fixed MAP reliability equaling the CMR (Block 1108).

Figure 12:
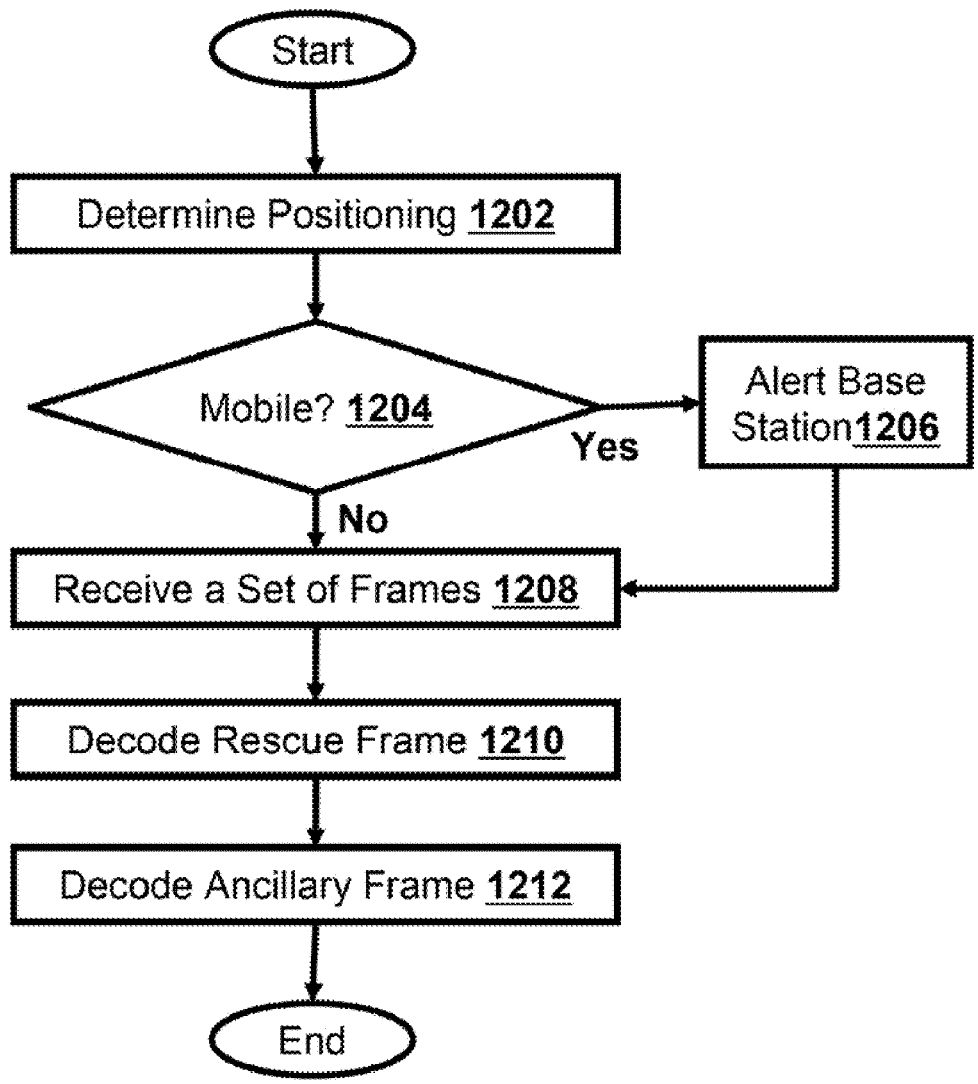
FIG. 12 illustrates one embodiment of a method for receiving data with a hybrid rescue frame schedule.

FIG. 12 illustrates one embodiment of a method 1200 for receiving data with a hybrid rescue frame schedule. The user communication device 106 may determine its positioning within the cell area (Block 1202). If the user communication device 106 is mobile (Block 1204), the user communication device 106 may alert the base station 104 (Block 1206). The user communication device 106 may receive a set of frames including a rescue frame 502 and an ancillary frame 504 (Block 1208). The user communication device 106 may decode the rescue frame 502 with a high overhead to data ratio (Block 1210). The user communication device 106 may decode the ancillary frame 504 with a low overhead to data ratio (Block 1212).

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the invention are part of the scope of this invention. For example, the principles of the invention may be applied to each individual user where each user may individually deploy such a system. This enables each user to utilize the benefits of the invention even if any one of the large number of possible applications do not need the functionality described herein. In other words, there may be multiple instances of the electronic devices each processing the content in various possible ways. It does not necessarily need to be one system used by all end users. Accordingly, the appended claims and their legal equivalents should only define the invention, rather than any specific examples given.

We claim:

1. A method for transmitting control data, comprising:
   encoding a first frame of a set of frames with a first overhead to data ratio;
   encoding a second frame of the set of frames with a second overhead to data ratio, wherein the first overhead to data ratio is higher than the second overhead to data ratio; and
   transmitting the set of frames.

2. The method of claim 1, further comprising:
   encoding an overhead of the first frame with a first repetition rate; and
   encoding an overhead of the second frame with a second repetition rate, wherein the first repetition rate is higher than the second repetition rate.

3. The method of claim 1, further comprising:
   encoding an overhead of the rescue frame with a first coding rate; and
   encoding an overhead of the second frame with a second coding rate, wherein the first coding rate is higher than the second coding rate.

4. The method of claim 1, further comprising:
   encoding an overhead of the first frame with a first modulation scheme; and
   encoding an overhead of the ancillary second frame with a second modulation scheme, wherein the first modulation scheme is less complex than the second modulation scheme.

5. The method of claim 1, further comprising:
   sending the first frame subset and the second frame on a fixed frame schedule.

6. The method of claim 1, further comprising:
   sending the first frame and the second frame on an adjustable frame schedule.

7. The method of claim 6, further comprising:
   adapting the adjustable frame schedule based on at least one of radio frequency channel quality, hybrid-automatic repeat request cycle, access opportunity, periodic control information, and device mobility.

8. The method of claim 1, further comprising:
   adjusting the second overhead to data ratio of the second frame.

9. A base station for transmitting control data, comprising:
   a processor that encodes a first frame of a set of frames with a first overhead to data ratio and a second frame of the set of frames with a second overhead to data ratio, wherein the first overhead to data ratio is higher than the second overhead to data ratio; and
   a transceiver that transmits the set of frames.

10. The base station of claim 9, wherein the processor encodes an overhead of the first frame with a first repetition rate and an overhead of the second frame with a second repetition rate, wherein the first repetition rate is higher than the second repetition rate.

11. The base station of claim 9, wherein the processor encodes an overhead of the rescue frame with a first coding rate and an overhead of the second frame with a second coding rate, wherein the first coding rate is higher than the second coding rate.

12. The base station of claim 9, wherein the processor encodes an overhead of the first frame with a first modulation scheme and an overhead of the second frame with a second modulation scheme, wherein the first modulation scheme is less complex than the second modulation scheme.

13. The base station of claim 9, wherein the transceiver sends the first frame and the second frame on a fixed frame schedule.

14. The base station of claim 9, wherein the transceiver sends the first frame and the second frame on an adjustable frame schedule.

15. The base station of claim 14, wherein the processor adapts the adjustable frame schedule based on at least one of radio frequency channel quality, hybrid-automatic repeat request cycle, access opportunity, periodic control information, and device mobility.

16. The base station of claim 9, wherein the processor adjusts the second overhead to data ratio of the second frame.

17. A user communication device for receiving data on an orthogonal frequency-division multiplexing, comprising:
   a transceiver that receives a set of frames; and
   a processor that decodes a first frame of the set of frames with a first overhead to data ratio and second frame of the set of frames with a second overhead to data ratio, wherein the first overhead to data ratio is higher than the second overhead to data ratio.

18. The user communication device of claim 17, wherein the transceiver receives the first frame and the second frame on a fixed frame schedule.

19. The user communication device of claim 17, wherein the transceiver receives the first frame and the second frame on an adjustable frame schedule.

20. The user communication device of claim 17, wherein the second ancillary overhead to data ratio of the second frame is adjusted.

* * * * *